US010089203B2

(12) United States Patent
Mohan et al.

(10) Patent No.: US 10,089,203 B2
(45) Date of Patent: Oct. 2, 2018

(54) ARTIFICIAL INTELLIGENCE BASED HEALTH MANAGEMENT OF HOST SYSTEM

(71) Applicant: Tata Consultancy Services Limited, Mumbai (IN)

(72) Inventors: Sreeram Mohan, Bangalore (IN); Pallanti Srinivasa Rao, Bangalore (IN); Venkateshwar Chindam, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 10 days.

(21) Appl. No.: 15/074,549

(22) Filed: Mar. 18, 2016

(65) Prior Publication Data

US 2016/0350194 A1    Dec. 1, 2016

(30) Foreign Application Priority Data

May 27, 2015   (IN) .......................... 2066/MUM/2015

(51) Int. Cl.
*G06F 11/00*    (2006.01)
*G06F 11/22*    (2006.01)
(Continued)

(52) U.S. Cl.
CPC ...... *G06F 11/2257* (2013.01); *G05B 23/0254* (2013.01); *G06N 3/088* (2013.01); *G06N 99/005* (2013.01)

(58) Field of Classification Search
CPC . G06F 11/2257; G06F 11/2263; G06N 3/088; G05B 23/0254
See application file for complete search history.

(56) References Cited

U.S. PATENT DOCUMENTS 5,402,521 A * 3/1995 Niida ................. G06K 9/00536
128/925
5,544,308 A    8/1996 Giordano et al.
(Continued)

OTHER PUBLICATIONS

Gupta, S. et al., "Fault detection and isolation in aircraft gas turbine engines. Part 1: underlying concept", Proc. IMechE, Sage Publication, vol. 222, pp. 307-318, Part G: J. Aerospace Engineering, (2008).

*Primary Examiner* — Philip Guyton
(74) *Attorney, Agent, or Firm* — Finnegan, Henderson, Farabow, Garrett & Dunner LLP (57) ABSTRACT

This disclosure relates generally to health management, and more particularly to a method and system for artificial intelligence based diagnostic and prognostic health management of host systems. In an embodiment, the system includes a memory to store instructions, and a neural network controller coupled to the memory. The neural network controller is configured by the instructions to monitor a plurality of unique patterns generated in real-time. The plurality of system parameters is indicative of a system-level performance of the host system. The neural network controller is configured by the instructions to compare the plurality of unique patterns with a plurality of predetermined patterns corresponding to the plurality of system parameters to detect potential anomalies in the host system and one or more subsystems of the plurality of subsystems, where the one or more subsystems are responsible for contributing to the potential anomalies in the host system.

11 Claims, 4 Drawing Sheets

(51) Int. Cl.
  *G05B 23/02* (2006.01)
  *G06N 3/08* (2006.01)
  *G06N 99/00* (2010.01)

(56) References Cited

U.S. PATENT DOCUMENTS

| | | | | |
|---|---|---|---|---|
| 5,919,267 | A * | 7/1999 | Urnes | G06F 11/0736 714/26 |
| 6,105,149 | A * | 8/2000 | Bonissone | G06F 11/2257 706/62 |
| 2002/0066054 | A1* | 5/2002 | Jaw | G05B 9/03 714/48 |
| 2006/0230313 | A1 | 10/2006 | Grichnik et al. | |
| 2009/0216393 | A1* | 8/2009 | Schimert | G05B 23/0251 701/14 |
| 2013/0060524 | A1* | 3/2013 | Liao | G05B 23/0254 702/184 |
| 2014/0039834 | A1* | 2/2014 | Shibuya | G06F 11/22 702/183 |

\* cited by examiner

ARTIFICIAL INTELLIGENCE BASED HEALTH MANAGEMENT OF HOST SYSTEM

PRIORITY CLAIM

This U.S. patent application claims priority under 35 U.S.C. § 119 to: India Application No. 2066/MUM/2015, filed on May 27, 2015. The entire contents of the aforementioned application are incorporated herein by reference.

TECHNICAL FIELD

This disclosure relates generally to health management and more particularly to a method and system for artificial intelligence (AI) based diagnostic and prognostic health management of host systems.

BACKGROUND

With the advancement of technology, multi-domain 'mechatronics' systems are being developed that operates in a closed-loop/close-interaction. Examples of such system include vehicle systems, aircraft systems, automotive systems, turbine engines, and so on. Since the systems being developed these days are complex, the health management of such systems pose challenges, as failure of any critical system component can trigger catastrophic system failures. Hence, health management of such multi-domain complex systems is of vital importance.

An effective health management of these complex systems requires monitoring of all components of the system. The conventional systems for health management of these complex systems use sensor based approach where distinct sensors are deployed for monitoring individual component or subsystem. Additionally or alternatively, conventional health management systems follow condition based maintenance or offline big data analytics which is not real time and predominantly not on-board. Such technologies leverage on sensory data as a source and also are tightly coupled to subsystem level.

The inventors here have recognized several technical problems with such conventional systems, as explained below. In a complex system, sensor count increases as the system becomes more complex, thereby loading the conventional health management system with more elements to monitor. In addition, the conventional health management system provides a purely hardware based approach and hence, it is difficult to meet real time constraints set by a hard real-time complex system.

SUMMARY

Embodiments of the present disclosure present technological improvements as solutions to one or more of the above-mentioned technical problems recognized by the inventors in conventional systems. For example, in one embodiment, a processor-implemented method for artificial intelligence based health management of a host system is provided. The method includes diagnosis and prognosis of the complex host system by a health management system. In an embodiment, the method includes provisioning a health management system having a memory and a neural network controller coupled to the memory. The memory is configured to store instructions and a plurality of predetermined patterns indicative of system-level performance of the host system, under a normal working condition of the plurality of subsystems and a plurality of abnormal working conditions of one or more subsystems of the plurality of subsystem. Further the method includes monitoring a plurality of unique patterns generated in real-time, the plurality of unique patterns comprising responses associated with a set of system parameters of the host system, the set of system parameters indicative of the system-level performance of the host system in real-time. Furthermore the method includes comparing the plurality of unique patterns with the plurality of predetermined patterns corresponding to the set of system parameters. Moreover, the method includes detecting one or more potential anomalies in the host system and at least one faulty subsystem of the plurality of subsystems based on the comparison, the at least one faulty subsystem responsible for contributing to the one or more potential anomalies in the host system.

In another embodiment, a health management system for diagnosis and prognosis of a host system is provided. The host system includes a plurality of subsystems. The health management system includes a memory to store instructions and a plurality of predetermined patterns indicative of system-level performance of the host system, under normal working condition of the plurality of subsystems and a plurality of abnormal working conditions of one or more subsystems of the plurality of subsystems; and a neural network controller coupled to the memory. The neural network controller is configured by the instructions to monitor a plurality of unique patterns generated in real-time, the plurality of unique patterns comprising responses associated with a set of system parameters of the host system. The set of system parameters is indicative of the system-level performance of the host system in real-time. Further, the neural network controller is configured by the instructions to compare the plurality of unique patterns with the plurality of predetermined patterns corresponding to the set of system parameters. Furthermore, the neural network controller is configured by the instructions to detect one or more potential anomalies in the host system and at least one faulty subsystem of the plurality of subsystems based on the comparison. The at least one faulty subsystem is responsible for contributing to the one or more potential anomalies in the host system.

In yet another embodiment, a non-transitory computer-readable medium having embodied thereon a computer program for executing a method for diagnosis and prognosis of the host system is provided. The health management system includes a memory and a neural network controller coupled to the memory. The memory is configured to store instructions and a plurality of predetermined patterns indicative of system-level performance of the host system, under a normal working condition of the plurality of subsystems and a plurality of abnormal working conditions of one or more subsystems of the plurality of subsystem. In an embodiment, the method includes monitoring a plurality of unique patterns generated in real-time, the plurality of unique patterns comprising responses associated with a set of system parameters of the host system, the set of system parameters indicative of the system-level performance of the host system in real-time. Furthermore the method includes comparing the plurality of unique patterns with the plurality of predetermined patterns corresponding to the set of system parameters. Moreover, the method includes detecting one or more potential anomalies in the host system and at least one faulty subsystem of the plurality of subsystems based on the comparison, the at least one faulty subsystem responsible for contributing to the one or more potential anomalies in the host system.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The manner, in which the system and method for artificial intelligence (AI) based health management of a host system, shall be implemented, has been explained in details with respect to the FIGS. 1 through 5B. While aspects of described methods and systems for AI based health management of the host system can be implemented in any number of different systems, utility environments, and/or configurations, the embodiments are described in the context of the following exemplary system(s).

Herein, the host system can be a complex system. A complex system includes a large number of components/subsystems, and thus diagnosis and/or prognosis of faults in the complex system can be challenging. Examples of a complex system may include vehicle systems, aircraft systems, automotive systems, turbine engines systems, and so on. Monitoring of such complex systems for a subsystem level faults may pose various challenges, as it may not be possible to single out a faulty component since there can be identical response for different subsystems failure. An example of a complex host system with system responses to various faulty conditions is illustrated with reference to FIGS. 1A-1C.

Figure 1A:
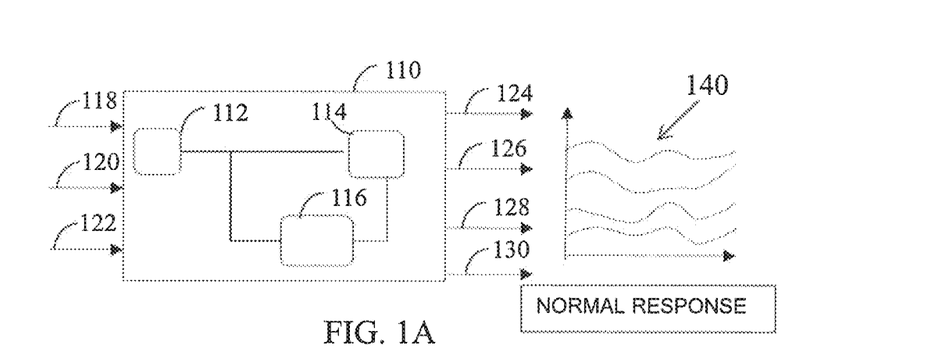
FIGS. 1A-1C illustrate an illustrate responses of an exemplary host system during normal and abnormal scenarios according to some embodiments of the present disclosure.
Figure 1B:
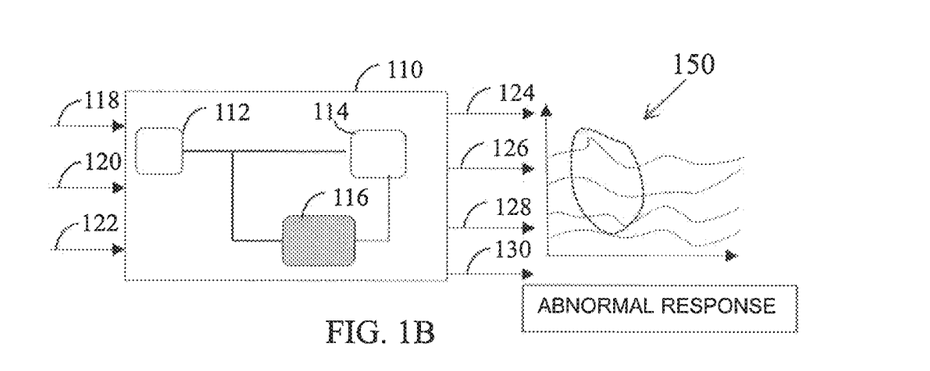
Figure 1C:
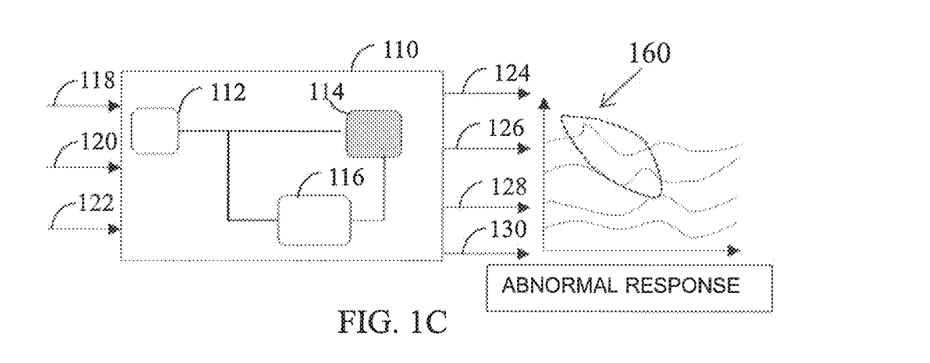

FIGS. 1A-1C illustrates responses of an exemplary complex host system 110 during normal and abnormal scenarios, in accordance with an example embodiment. In an embodiment, a 'normal scenario' or a 'normal condition' may refer to a scenario where the system response is determined to be as expected. Also, an 'abnormal response' or an 'abnormal condition' may be a scenario where the system response is deviated from the expected response. In other words, an abnormal response may be generated due to faulty conditions in one or more system components or subsystems.

The host system 110 includes multiple components/subsystem such as components 112, 114, 116. Also, the host system 110 includes multi-input multi-output system, and thus is configured to receive multiple inputs such as inputs 118, 120 and 122 and provide multiple outputs such as outputs 124, 126, 128, and 130. During a normal response scenario, the response of the host system may be within acceptable ranges/limits, as is depicted in FIG. 1A. However, during an abnormal response scenario depicted by FIGS. 1B and 1C, the response of the host system 110 is not within the specified limits. Herein, the response of the host system includes unique patterns being generated corresponding to system parameters, and are indicative of system-level performance of the host system.

During the abnormal response scenario, it may not be possible to single out the faulty component as there can be identical response for different subsystems failures. However, additional system performance can provide more insights with certain 'uniqueness' in the response as a whole for any sub-system failures. For instance, analysis of the response from FIGS. 1B and 1C of the abnormal system performance may show certain 'unique signatures' or 'unique patterns' for different subsystem faults. For example, in FIG. 1B, the system component 116 is faulty and in FIG. 1C, the system component 114 is faulty, and accordingly the corresponding system responses 150 and 160, respectively shows different signatures which are unique for respective subsystems, and hence are termed as 'unique' signatures. The identification of these 'unique' signatures can be hard real-time constraint due to processing overhead. Various embodiments have been proposed herein which facilitate health management of complex host systems in real-time by performing 'identification' of these unique signatures in real-time. It will be noted herein that the disclosed embodiments facilitate in 'identification' of said unique signatures in real-time without depending on physical sensors for detection of every fault.

Various exemplary embodiments discussed herein disclose health management systems for monitoring health of a host system in real-time. The health management of the host system may facilitate in deriving health status of various subsystems/components of the system by monitoring system-level responses of the plurality of subsystems. Based on an overall system-level response, various distinguishing features can be derived, through for example, feature extraction methodologies. These features can then be fed into a decision making frameworks to determine the health of the system. In an embodiment, the decision making frameworks are implemented by using Neural Networks (NN). In an embodiment, the health management system may include a neural network based controller (or a neural network controller) that is trained to recognize/detect unique patterns of system responses for various normal and abnormal performance scenarios due to sub-system failures and identify failed component triggering a system level failure. An example implementation of a health management system with a host system is described further with reference to FIG. 2.

Figure 2:
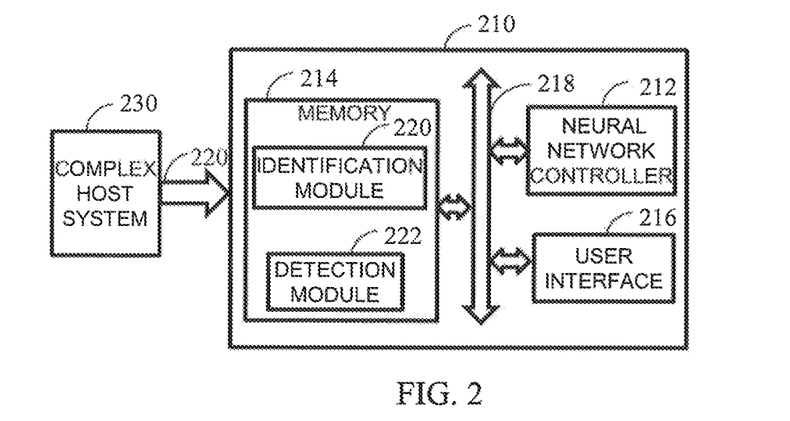
FIG. 2 illustrates an implementation of an artificial intelligence (AI) based health management system for monitoring health of a host system according to some embodiments of the present disclosure.

FIG. 2 illustrates an implementation of an AI based health management system 210 for monitoring health of a host system 230, in accordance with an example embodiment. Examples of the host system 230 may include, but are not limited to vehicle systems, aircraft, automotive, turbine engines, and so on. In an embodiment, the host system 230 may include a plurality of subsystems (or system components). In an embodiment, one or more subsystems of the plurality of subsystem (or system components) may become faulty, and affect the heath of the entire host system 230. To avoid such situations, the health management system 210 is configured to receive system response 240 from the host system 230, and provide real-time diagnostic and prognostic health management of the host system 230. Herein, the system response 240 is indicative of the system-level performance of the host system 230.

The health management system 210 includes or is otherwise in communication with at least one processor such as a processor 212, at least one memory such as a memory 214, and a user interface 216. The processor 212, the memory 214, and the user interface 216 may be coupled by a system bus such as a system bus 218 or a similar mechanism. Although FIG. 2 shows example components of health management system 210, in other implementations, health management system 210 may contain fewer components, additional components, different components, or differently arranged components than depicted in FIG. 2.

The processor 212 may include circuitry implementing, among others, logic functions associated with the computation and control functions of the health management system 210. For example, the neural network controller 212 may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits. Examples of the neural network controller may include, but are not limited to, Raspberry Pi™ controller, Arduino™ controller, and the like. The processor 212 may also include the functionality to encode messages and/or data or information. The processor 212 may include, among other things, a clock, an arithmetic logic unit (ALU) and logic gates configured to support operation of the processor 212. Further, the processor 212 may include functionality to execute one or more software programs, which may be stored in the memory 214 or otherwise accessible to the processor 212.

The memory 214, may store any number of pieces of information, and data, used by the health management system 210 to implement the functions of the health management system 210. The memory 214 may include for example, volatile memory and/or non-volatile memory. Examples of volatile memory may include, but are not limited to volatile random access memory (RAM). The non-volatile memory may additionally or alternatively comprise an electrically erasable programmable read only memory (EEPROM), flash memory, hard drive, or the like. The memory 204 may be configured to store information, data, applications, instructions or the like for enabling the health management system 210 to carry out various functions in accordance with various example embodiments. Some example of the non-volatile memory includes, but are not limited to, hard disks, magnetic tapes, optical disks, programmable read only memory, erasable programmable read only memory, electrically erasable programmable read only memory, flash memory, and the like. The memory 214 may be configured to store information, data, applications, instructions or the like for enabling the system 200 to carry out various functions in accordance with various example embodiments. Additionally or alternatively, the memory 214 may be configured to store instructions which when executed by the processor 212 causes the health management system 210 to behave in a manner as described in various embodiments. For example, the memory 214 may include an identification module 220 for identification of abnormal condition based on the system level response 240. Addition, the memory 214 may include a detection module 222 for identifying a failed component/sub-system that may have led to observable abnormality in the system response (root cause).

The user interface 206 may include an output device such as a ringer, an earphone or speaker, a microphone, a display, and an input interface. The input interface is configured to receive an indication of a user input for simulating fault scenarios in the health management system. Examples of the input interface may include, but are not limited to, a keyboard, a mouse, a joystick, a keypad, a touch screen, soft keys, and the like. The output user interface provides an audible, visual, mechanical or other output and/or feedback to the user based on the simulation. Examples of the output interface may include but are not limited to, a display, a microphone, a speaker, ringers, vibrators, and the like. In an example embodiment, the user interface 216 may include, among other devices or elements, any or all of a speaker, a microphone, a display, and a keyboard, touch screen, or the like. The user interface 216 may be in communication with the processor 212. In this regard, for example, the processor 212 may comprise user interlace circuitry configured to control at least some functions of one or more elements of the user interface 216. The processor 212 and/or user interface circuitry comprising the processor 212 may be configured to control one or more functions of one or more elements of the user interface 216 through computer program instructions, for example, software and/or firmware, stored on a memory, for example, the memory 214, and/or the like, accessible to the processor 212. The user interface 216 allows communication to and from a system operator, an operator of the vehicle and/or other systems such as the host system 230.

In an example embodiment, the processor 212 along with memory 214 and other components of the health management system 210 (hereinafter referred to as system 210) may be configured to identify one or more failed subsystems of the host system 230. In an embodiment, the failed subsystem of a host system 230 is identified by monitoring the system level performance/response 240 of the host system 230. The state of the host system 230 may be determined based on a diagnostic management. The diagnostic management of the system level response may be performed by the neural network controller (or the processor) 212 of the health management system 210. Herein, the controller is an artificial intelligence controller.

The processor 212 along with memory 214 and other components of the system 210 is configured to detect any abnormal working condition based on the system level response 240. In addition, the processor 212 is configured to identify a failed component or sub-system that may have led to observable abnormality in the system response (root cause). The diagnostic management performed by the processor 212 is based on observed system states, applying past performance knowledge, and/or based on expertise built over a period. In an embodiment, the processor 212 along with memory 214 and other components of the system 210 is configured to monitor a plurality of unique patterns associated with system level performance/response 240 of the host system generated in real-time. In an embodiment, the plurality of unique patterns includes responses associated with a set of system parameters of the host system 230. Herein, the system parameters may include one or more of input parameters, control parameters, feedback parameters, output parameters, and so on. It will be noted herein that the set of system parameters includes only a subset of a plurality of system parameters of the host system, and a key feature of the various embodiments of the present disclosure is that the disclosed system is capable of determining one or more failed subsystem/potential anomalies in the host system by determination of system level response generated based only on the set of system parameters (and not on the plurality of system parameters). Accordingly, the disclosed system can effectively manage the health of the host system in a computationally efficient manner.

In an embodiment, the processor 212 along with memory 214 and other components of the system 210 is configured to compare the plurality of unique patterns with a plurality of predetermined patterns corresponding to the plurality of system parameters to detect one or more potential anomalies in the host system and at least one faulty subsystem responsible for contributing to the potential anomalies in the host system. Herein, the plurality of predetermined patterns are preconfigured by training a neural network model.

In an embodiment, the processor 202 along with memory 204 and other components of the system 210 preconfigure the plurality of predetermined patterns by acquiring a training data. The training data includes the system-level performance under a normal and a plurality of abnormal working conditions of the plurality of subsystems. In an embodiment, the processor 212 along with memory 214 and other components of the system 210 are further configured to extract a plurality of feature vectors from the training data. In an embodiment, the plurality of feature vectors exhibits the plurality of predetermined patterns indicative of the one or more anomalies in the host system. Additionally, the plurality of predetermined patterns may also indicate the faulty subsystems that may be associated with an anomaly or a potential anomaly.

In an embodiment, the processor 212 along with memory 214 and other components of the system 210 are configured to train an artificial intelligence model, for example a neural network model based on the plurality of feature vectors to classify the one or more anomalies with the one or more corresponding subsystems responsible for contributing to the one or more potential anomalies. A detailed functional model of various modules of the health management system 210 is illustrated and described further with reference to FIG. 3.

Figure 3:
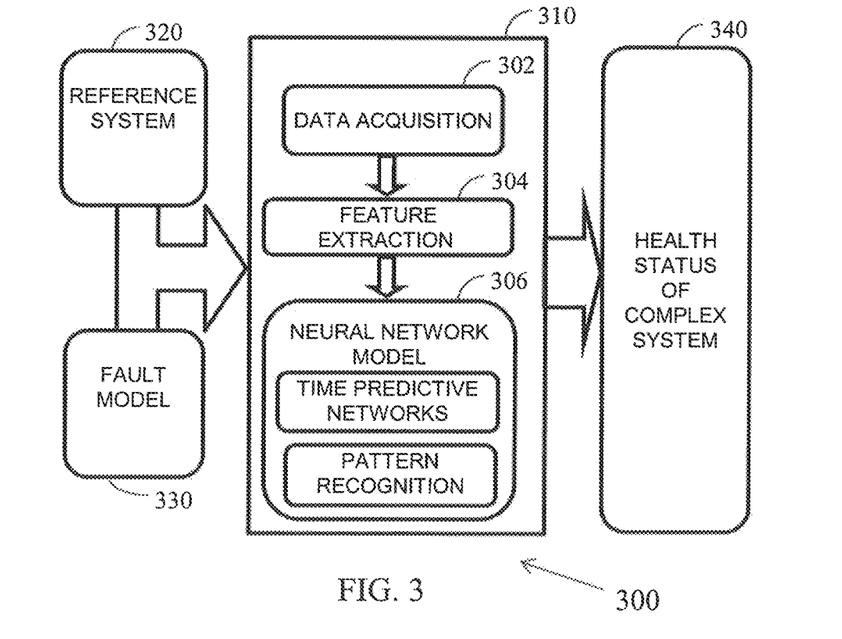
FIG. 3 illustrates a block diagram of an AI based health management system in accordance with some embodiments of the present disclosure.

FIG. 3 illustrates a block diagram 300 of an artificial intelligence based health management system. in accordance with an example embodiment. The artificial intelligence based health management system 300 may hereinafter be referred to as system 300. The system 300 may be an example of the health management system 210 (FIG. 2). In an embodiment, the system 300 is configured to derive the health status of a plurality of subsystems of a host system based on the monitoring of the system level responses of the host system. The system 300 is further configured to derive distinguishing features from the overall system level response through feature extraction methodologies. In addition, the system is configured to provide said features to a decision making frameworks. Herein, the decision making frameworks may include an AI model that is configured to learn the host system as well as generalize the model so that it could be applied to diagnose unseen cases that are critical and difficult to address through conventional algorithm based approach. In an embodiment, the decision making frameworks may be implemented using Neural Networks (NN). The functional block diagram 300 illustrates various functional modules of the health management system.

At block 302, the system performance is simulated for normal and abnormal scenarios, and further acquires and processes the response (for example, the system response 240 of FIG. 2). In an embodiment, the simulation data is utilized for the training of the health management system. A pictorial depiction of a normal response and an abnormal response is already described with reference to FIG. 1. In an embodiment, the data acquisition facilitates in detection and identification of abnormal response. Herein, 'detection' may refer to an ability to distinguish normal and abnormal performance of the host system based on domain experience and training (system failure modes and their effects), taking care of many operational conditions. The 'identification' may refer to an ability to identify the failed component that can lead to such observable abnormality in the system response (root cause).

In an embodiment, detection of the abnormal response and identification of the faulty subsystem may be performed by simulating the failure modes of various sub-systems and generating the system response under various normal and abnormal conditions. The training data is used for the training of the health management system. In order to learn the impact of various faults in the system, a replica of the system or a reference system (such as reference system 320) may be configured where different fault scenarios may be introduced for analysis of the system response. In an embodiment, the fault scenarios may be introduced by a fault model such as a fault model 330. The system level outputs of both the reference system 320 as well as the fault model 330 may be captured continuously in a specified window of time scale and preprocessed to remove trends in data so as to process unique signals.

At block 304, the features (or feature vectors) from the data are extracted that can be used for training the health management system. In an embodiment, various statistical and signal processing functions are applied on the data to extract the features. These feature vectors exhibit unique patters or signatures that can be analyzed for various fault scenarios. The feature vectors are used as inputs to the neural network model and are trained to classify the failures with the associated root causes by leveraging domain knowledge. Once trained extensively and the generalization is achieved the network is deployed on a target hardware to accept signals in real time. In an example embodiment, the feature extraction module may implement a plurality of algorithms for feature extraction. Examples of such algorithms may include, but are not limited to, Root Mean Square (RMS), Short Time Fourier Transform (STFT), Mean, variance, fast Fourier Transform (FFT), Discrete Wavelength Transform (DWT), Discrete Time Fourier Transform (DTFT), Spectrum, and so on.

At block 306, the feature vectors are inputs to artificial intelligence network such as the neural networks. The artificial intelligence network is trained to classify the faulty scenarios/failures with the associated root causes by leveraging domain knowledge. Once trained, the artificial intelligence network could be deployed on the hardware along with the system under operation for predicting the future time series. The failure classification artificial intelligence network designed earlier is applied to the time predictive neural network to know not only that an anomaly would occur but also which component or components in the subsystem would contribute to the failures. Herein, the health management system utilizes the strengths of the artificial intelligence networks such as the neural networks to learn a host system as well as generalize the model so that it could be applied to diagnose unseen cases that are critical and difficult to address through conventional algorithm based approach.

At block 340, the output of classification of the faulty scenarios/failures being performed by the artificial intelligence networks is provided at a user interface, for example, UI 216 of the health management system. Example screenshots illustrating the user interfaces of the health management system are described further with reference to FIGS. 5A and 5B.

Figure 4:
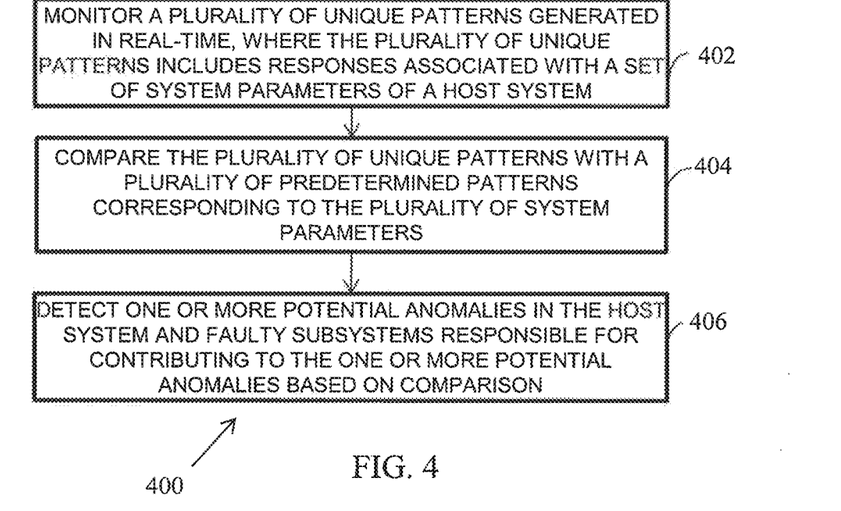
FIG. 4 illustrates a flowchart of an example method for health management of a host system according to some embodiments of the present disclosure.

FIG. 4 illustrates a flowchart 400 of an example method for health management of a host system, in accordance with an example embodiment. At 402, a plurality of unique patterns including responses associated with a plurality of system parameters of the host system is monitored. The unique patterns may be generated in real-time. The plurality of system parameters is indicative of a system-level performance of the host system. In an embodiment, the system (for example, the system 200/300) may monitor the unique patterns.

At 404, the method includes comparing the plurality of unique patterns with a plurality of predetermined patterns corresponding to the plurality of system parameters to detect one or more potential anomalies in the host system and at least one faulty subsystems of the plurality of subsystems. In an embodiment, the plurality of predetermined patterns are obtained based on a training of a neural network based controller by a training data (as described with reference to FIG. 3). In an embodiment, the training data is acquired pertaining to system level response under various normal and abnormal conditions of a host. The acquired data is used for training of the health management system (in particular, controller of the health management system). In an example embodiment, in order to learn the impact of various faults in the system, a replica of the system may be made where different fault scenarios can be introduced for analysis of the system response. The system level outputs of both the reference as well as the fault introduced model are captured continuously in a specified window of time scale and preprocessed to remove trends in data so as to process unique signals. Further, a plurality of features (or feature vectors) is extracted from the acquired data. In an embodiment, statistical and signal processing functions are applied on the data to extract the features that exhibit signatures which could be analyzed for various fault scenarios. The extracted feature-vectors are used as inputs to neural networks and are neural networks are trained to classify the failures with the associated root causes by leveraging domain knowledge. In an embodiment, the neural networks are trained for pattern recognition of various fault signatures. The trained neural network can be deployed on the hardware along with the system under operation to identify the potential anomalies in the host system as well as the faulty subsystems responsible for contributing to the one or more potential anomalies in the host system.

Figure 5A:
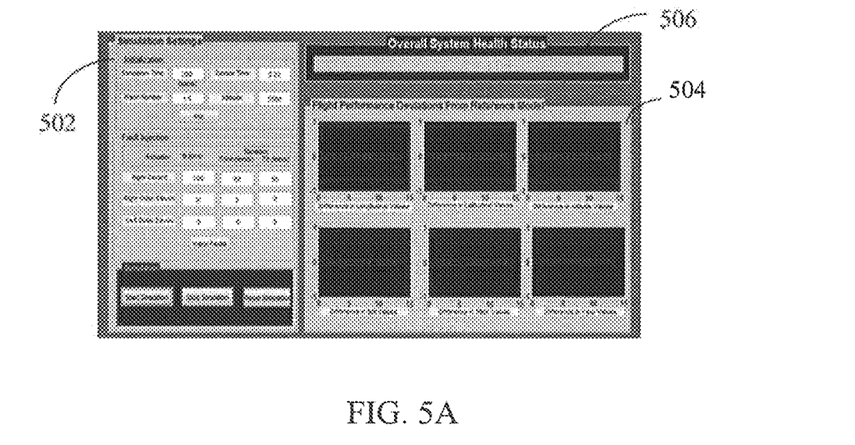
FIGS. 5A and 5B illustrate screenshots of an AI based health management system in normal scenarios and abnormal working conditions, respectively in accordance with some embodiments of the present disclosure.
Figure 5B:
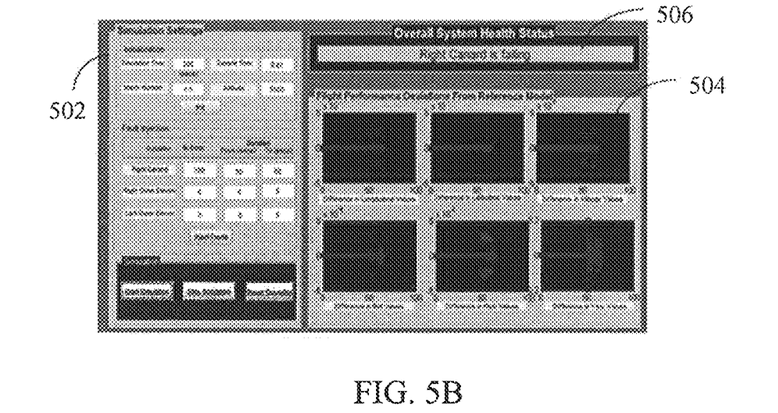

FIGS. 5A and 5B illustrate exemplary screenshots of a health management system in normal scenarios and abnormal scenarios respectively, in accordance with an example embodiment, Herein, the screenshot illustrated in FIGS. 5A and 5B represent graphical user interface (GUI) for failure mode simulations, for a host system such as an on-board flight system.

As illustrated in FIGS. 5A and 5B, the GUI includes multiple windows such as windows 502, 504, and 506 for showing simulation settings, flight performance deviations from reference model and overall system health, respectively. The window 502 provides an interface for inputting various simulation parameters.

During the normal scenario, the window 504 illustrates smooth responses without any deviations. Also, the window 506 depicting the overall system health provides status such as 'All systems are healthy'. However, during the abnormal scenario, as illustrated in FIG. 5B, the window 504 illustrates a responses with deviations. Also, the window 506 depicts the overall system health provides status pertaining to failure of specific system components/subsystems. For example, the dashboard may alert the user/pilot about the root cause in case of a fault scenario by flashing a warning in the window 506. It will be understood that the alert may be provided by any know techniques/ways without limiting the scope of various embodiments.

In an example scenario, the control actuators and sensors may be selected as candidate subsystems which may develop fault during a flight. Generally, the fault in these subsystems, due to reasons such as leakage of hydraulic fluid/crack in the manifold etc., result in the dynamics performance parameters such as speed of response, damping coefficient, etc. The faults are simulated in the health management system by varying these parameters beyond the design tolerances. As the simulation is run in non-real time environment, the faults are programmed to occur at some specified time of the flight.

Various embodiments of the disclosure provide method and system for health management of host systems. For example, various embodiments provides methods for observing only a limited set of system level response of the overall system and then come up with an understanding of the fault behaviors of all the critical sub components of the system. The method avoids the need for additional sensors to learn more parameters of an existing host system. In addition, the method aims at creating an on board system that works in cohesion with the system under operation and performs diagnostics as well as prognosis on the subsystem level components.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A system for artificial intelligence based diagnosis and prognosis of a host system having multiple subsystems, the system comprising:
    a memory to store instructions and a plurality of predetermined patterns; and
    a neural network controller coupled to the memory, wherein the neural network controller is configured by the instructions to:
        monitor a plurality of unique patterns generated in real-time corresponding to a subset of multiple system parameters of the host system, wherein the system parameters comprise at least one of one or more of input parameters, control parameters, feedback parameters, and output parameters, wherein the plurality of unique patterns are indicative of the system-level performance of the host system in real-time, and each of the unique patterns is unique for a respective subsystem of the host system and only the subset of system parameters are capable of determining one or more potential anomalies in the host system, and wherein the unique patterns enable identification of faults associated with one or more subsystems without depending on physical sensors for detecting fault in the subsystem, and wherein the neural network controller is configured to
        preconfigure the plurality of predetermined patterns by acquiring training data comprising the system-level performance of the host system under normal and abnormal working conditions of the one or more subsystems,
        extract a plurality of feature vectors from the training data, wherein the plurality of feature vectors exhibiting the plurality of predetermined patterns indicative of the one or more potential anomalies in the host system;
        detect the plurality of unique patterns generated in real-time based on the host system responses for the normal and abnormal working conditions due to the one or more subsystem failure, wherein the data acquisition enables detection and identification of abnormal response by enabling distinguishing the normal and abnormal performance of the host system based on domain experience and training associated with operational conditions to
        further identify a failed component/subsystem of the host system that leads to abnormality in the system response; and
        compare the plurality of unique patterns with the plurality of predetermined patterns corresponding to the subset of multiple system parameters to detect one or more potential anomalies in the host system and at least one faulty subsystem of the plurality of subsystems based on the comparison, the at least one faulty subsystem is responsible for contributing to the one or more potential anomalies in the host system.

2. The system of claim 1, wherein the neural network controller is further configured by the instructions to train a neural network model based on the plurality of feature vectors to classify the one or more potential anomalies with the at least one faulty subsystem responsible for contributing to the one or more potential anomalies.

3. The system of claim 1, wherein to acquire the training data, the neural network controller is further configured by the instructions to:
    simulate the normal working condition and the plurality of abnormal working conditions of the plurality of subsystems; and
    generate the system-level performance under the normal and the plurality of abnormal working conditions.

4. The system of claim 3, wherein to simulate the normal and the plurality of abnormal working conditions, the neural network controller is further configured by the instructions to:
    capture the system-level performance from a reference model and a fault introduced model continuously in a specified window of time scale, wherein the reference model comprises modeling of the normal working condition and the fault introduced model comprises modeling of the plurality of abnormal working conditions of the plurality of subsystems; and
    preprocess the system-level responses to remove trends in training data.

5. The system of claim 1, wherein the host system comprises one of an aircraft system, an automotive system, a turbine system and an engine system.

6. A processor-implemented method for artificial intelligence based diagnosis and prognosis of a host system having multiple subsystems, the method comprising:
    monitoring, by a neural network controller, a plurality of unique patterns generated in real-time corresponding to a subset of multiple system parameters of the host system, wherein the system parameters comprise at least one of one or more of input parameters, control parameters, feedback parameters, and output parameters, the plurality of unique patterns are indicative of the system-level performance of the host system in real-time, and each of the unique patterns is unique for a respective subsystem of the host system and only the subset of system parameters are capable of determining one or more potential anomalies in the host system, and wherein the unique patterns enable identification of faults associated with one or more subsystems without depending on physical sensors for detecting fault in the subsystem, and wherein the neural network controller is configured to
        preconfigure the plurality of predetermined patterns by acquiring training data comprising the system-level performance of the host system under normal and abnormal working conditions of the one or more subsystems; and extract a plurality of feature vectors from the training data, wherein the plurality of feature vectors exhibiting the plurality of predetermined patterns indicative of the one or more potential anomalies in the host system, and wherein the data acquisition enables detection and identification of abnormal working condition by enabling distinguishing the normal and abnormal performance of the host system based on domain experience and training associated with operational conditions to further identify a failed component/subsystem of the host system that leads to abnormality in the system response;

detect the plurality of unique patterns generated in real-time based on host system responses for various normal and abnormal performance scenarios due to one or more sub-system failures; and comparing, by the neural network controller, the plurality of unique patterns with the plurality of predetermined patterns corresponding to the subset of multiple system parameters for detecting, by the neural network controller, one or more potential anomalies in the host system and at least one faulty subsystem of the plurality of subsystems based on the comparison, the at least one faulty subsystem responsible for contributing to the one or more potential anomalies in the host system.

7. The method of claim 6, further comprising training a neural network model based on the plurality of feature vectors to classify the one or more potential anomalies with the at least one faulty subsystem responsible for contributing to the one or more potential anomalies.

8. The method of claim 6, wherein acquiring the training data comprises:

simulating the normal working condition and the plurality of abnormal working conditions of the plurality of subsystems; and generating the system-level performance under the normal and the plurality of abnormal working conditions.

9. The method of claim 8, wherein simulating the normal working condition of the plurality of sub-systems and the plurality of abnormal working conditions of the one or more subsystems comprises:

capturing the system-level performance from a reference model and a fault introduced model continuously in a specified window of time scale, wherein the reference model comprises modeling of the normal working condition and the fault introduced model comprises modeling of the plurality of abnormal working conditions of the plurality of subsystems; and pre-processing the system-level responses to remove trends in training data.

10. The method of claim 6, wherein the host system comprises one of an aircraft system, an automotive system, a turbine system and an engine system.

11. A non-transitory computer-readable medium having embodied thereon a computer program for executing a method for artificial intelligence based diagnosis and prognosis of a host system, the method comprising:

monitoring, by a neural network controller, a plurality of unique patterns generated in real-time, the plurality of unique patterns corresponding to a subset of multiple system parameters of the host system, wherein the system parameters comprise at least one of one or more of input parameters, control parameters, feedback parameters, and output parameters, the plurality of unique patterns are indicative of the system-level performance of the host system in real-time, and each of the unique patterns is unique for a respective subsystem of the host system and only the subset of system parameters are capable of determining one or more potential anomalies in the host system, and wherein the unique patterns enable identification of faults associated with one or more subsystems without depending on physical sensors for detecting fault in the subsystem, and wherein the neural network controller is configured to preconfigure the plurality of predetermined patterns by acquiring training data comprising the system-level performance of the host system under normal and abnormal working conditions of the one or more subsystems; and extract a plurality of feature vectors from the training data, wherein the plurality of feature vectors exhibiting the plurality of predetermined patterns indicative of the one or more potential anomalies in the host system, and wherein the data acquisition enables detection and identification of abnormal working condition by enabling distinguishing the normal and abnormal performance of the host system based on domain experience and training associated with operational conditions to further identify a failed component/subsystem of the host system that leads to abnormality in the system response;

detect the plurality of unique patterns generated in real-time based on the host system responses for various normal and abnormal performance scenarios due to one or more sub-system failures;

comparing, by a neural network controller, the plurality of unique patterns with the plurality of predetermined patterns corresponding to the subset of multiple system parameters; and detecting, by a neural network controller, one or more potential anomalies in the host system and at least one faulty subsystem of the plurality of subsystems based on the comparison, the at least one faulty subsystem responsible for contributing to the one or more potential anomalies in the host system.

* * * * *